(12) United States Patent
Webb

(10) Patent No.: US 6,600,467 B1
(45) Date of Patent: Jul. 29, 2003

(54) FLAT PANEL DISPLAY ARCHITECTURE

(76) Inventor: Homer L. Webb, 5217 Old Spice Wood Springs Rd., Ste. 2114, Austin, TX (US) 78731

( * ) Notice: Subject to any disclaimer, the term of this patent is extended or adjusted under 35 U.S.C. 154(b) by 0 days.

(21) Appl. No.: 09/559,033

(22) Filed: Apr. 27, 2000

Related U.S. Application Data

(60) Provisional application No. 60/131,403, filed on Apr. 28, 1999.

(51) Int. Cl.[7] .................................................. G09G 5/00
(52) U.S. Cl. ............................................. 345/87; 345/4
(58) Field of Search .......................... 345/4, 5, 93, 87, 345/89, 103; 349/143, 144, 110, 39, 40, 41, 42; 340/784

(56) References Cited

U.S. PATENT DOCUMENTS

| | | | | |
|---|---|---|---|---|
| 5,341,153 A | * | 8/1994 | Benzschawel et al. ...... 354/694 |
| 5,457,553 A | * | 10/1995 | Mori ............................ 349/39 |
| 5,528,395 A | * | 6/1996 | So ............................... 349/110 |
| 5,682,180 A | * | 10/1997 | Young et al. ................. 345/22 |
| 5,706,021 A | * | 1/1998 | Kurematsu .................. 345/103 |
| 5,790,213 A | * | 8/1998 | Sasaki et al. ................. 349/48 |
| 5,953,088 A | * | 9/1999 | Hanazawa et al. .......... 349/110 |
| 6,014,190 A | * | 1/2000 | Kim et al. ................... 349/139 |
| 6,226,057 B1 | * | 5/2001 | Lee ............................. 349/139 |
| 6,281,866 B1 | * | 8/2001 | Robinson et al. ............. 345/87 |
| 6,040,882 A1 | * | 3/2002 | Jun et al. ..................... 349/111 |

* cited by examiner

Primary Examiner—Vijay Shankar
Assistant Examiner—Nitin Patel
(74) Attorney, Agent, or Firm—Raymond Sun

(57) ABSTRACT

A transmissive, intermediate, common plane divides the display media in an information display structure to reduce the driven LCD material thickness to decrease the drive voltage. A higher contrast ratio is achieved by improved isolation of adjacent rows through multi-element display sites composed from the delineation of display sites into plural display elements by the common plane structure. Alternative multi-plane structures and a variety of methods to address a selected display location are disclosed. Phosphor and meshed or perforated electrodes obviate the need for color filters, provide improved brightness by minimizing light attenuation, lower manufacturing costs and improve the viewing angle. Further disclosed is a display architecture employing an invisible back-light for considerable power savings, mask elimination and bright and high contrast displays.

28 Claims, 11 Drawing Sheets

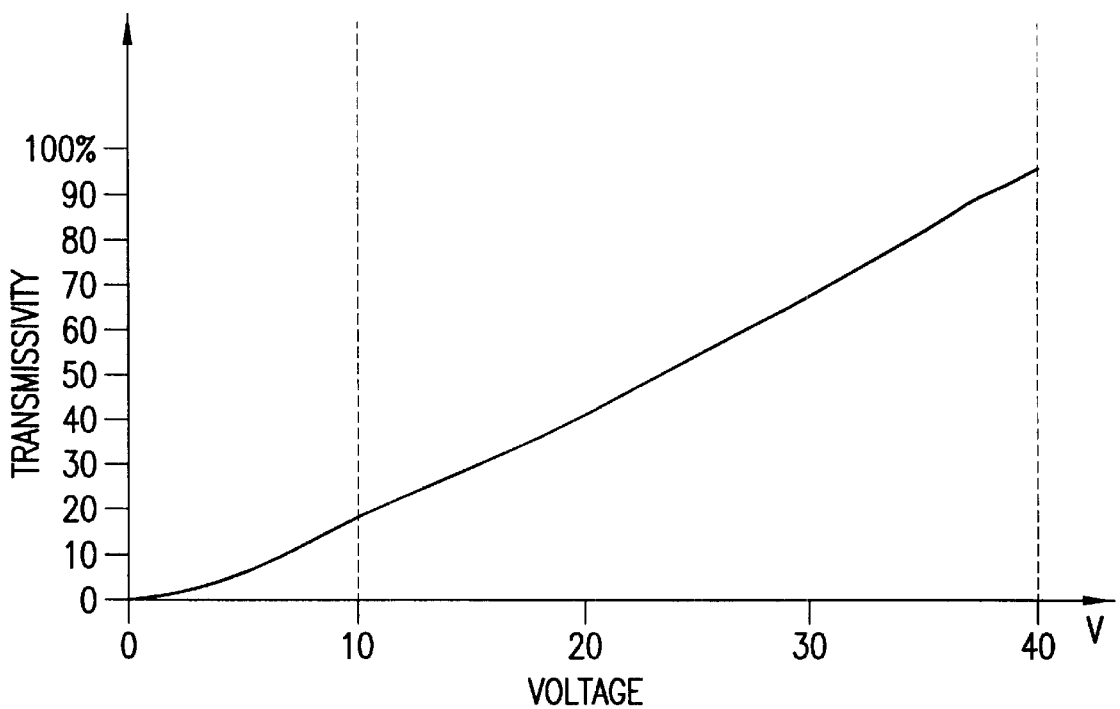

FLAT PANEL DISPLAY ARCHITECTURE

The present application is a continuation of provisional patent application Ser. No. 60/131,403, entitled Flat Panel Display Architecture, inventor Homer Webb, filed Apr. 28, 1999, which prior application is herby incorporated by reference.

TECHNICAL FIELD

The present invention relates to the field of display structures and display architecture. In particular, this invention relates to the architecture of passive liquid crystal display (LCD) flat panels.

BACKGROUND OF THE INVENTION

The number of applications for display technologies is rapidly increasing. However, display technologies have been generally employed in relatively small devices, such as, notebooks, computers, cameras, telephones, projection displays and direct-view flat panel televisions. For example, recent digital cameras employ flat panels as viewfinders and play back displays. Commonly, super twisted nematic (STN) displays are employed in such applications. On the other hand, more expensive thin film transistor (TFT) LCDs have applications in notebook computers and flat panel monitors.

The television industry is beginning to use flat panel displays and supplant older unwieldy cathode ray tube (CRT) technologies. For example, LCDs are becoming common in hand-held televisions. LCDs also provide some digital performance enhancements over older cathode ray tube (CRT) technologies.

The television market has been dominated by the CRT for the past few decades. As a result, the mature CRT manufacturing industry has been able to significantly lower the production cost of CRTs. Nevertheless, the market price for smaller televisions has eroded so that the cost to build a small CRT-based television is very close to the selling price. Therefore, there is little margin in the manufacturing cost to permit lowering the price to compete with lower cost alternatives. Consequently, a cost-driven market window for TV displays is apparent. Yet, current LCD architectures are too costly to exploit this potential opportunity and suffer from acceptance-limiting performance shortcomings. For example, it is too costly to build television size LCD displays, and the contrast ratio of most LCD displays has yet to rival CRTs.

Non-CRT based displays generally have limited viewing angle, poor contrast, low brightness, and high manufacturing costs. Numerous attempts have been made to overcome these drawbacks by devising different architectures and employing various materals.

For example, the electro-luminescent display showed early promise as a competitor to the CRT, but these displays were never able to match the color requirements or price goals for the television market. Currently, plasma displays may be the best contender to replace CRTs in the television market. Other than cost, plasma displays have all the attributes required for the television industry. Because of price, plasma displays are, targeted toward the commercial market and the high definition television consumer. Facilities to build these devices are very specialized and expensive.

Field emission displays have also been tried in television applications. Field emission displays are essentially flat CRTs that replace a single electron emitter (gun) with millions of tiny emitters. Theoretically, these displays should have exactly the same performance as CRT's. However, manufactured field emission displays have fallen short of expected performance and cost goals. Today, they have limited commercial and military sales in applications requiring ruggedness and low color definition such as instrumentation.

Currently, the premiere LCD flat panel is the thin film transistor (TFT) display. TFT displays employ one transistor (switch) for each sub pixel of the display (three sub-pixels red, green and blue make one pixel). Consequently, TFT displays are relatively expensive. A typical XGA flat panel has, for example, 2,359,296 transistors. In addition, each transistor must be functional. Development of production equipment and technology to reach significant yields has resulted in high fabrication costs. The typical factory investment is greater than several hundred million dollars. Additionally, millions of dollars every year are spent in research and development, increasing the costs by a significant amount. TFT displays are used in notebook computers, small hand-held televisions and monitor displays, and other similar devises.

In contrast to TFT displays, the super twisted nematic (STN) display is a much simpler device and the lowest cost LCD display technology available today. In a STN display, the pixels are formed by an orthogonal grid of transparent conductors placed on adjacent plates or substrates. The performance of these displays does not equal TFT's, but the cost is significantly less. Passive displays are used in common devices such as watches, gauges and games.

STN LCDs suffer from some performance shortcomings. For example, on existing STN LCD's, two polarizers are employed on each display. The polarizers reduce the light passing through the LCD by approximately 50%. Additionally, the liquid crystal display media must twist a certain amount to align the light between the polarizers. Consequently, the spacing between the top and bottom plates or substrates, the cell gap, is extremely critical. To maintain uniform spacing, the top and bottom plates are polished. Thousands of precision spacers are then sprayed onto one of the plates. These spacers maintain exact separation of the plates so that the liquid crystals twist no more than required to align the top and bottom polarizers. If the gap is too large or too small, the crystal "over twists" or "under twists." Any variation in thickness or twist causes distorted images.

The viewing angle of a typical LCD is affected by the orientation of the light passing through the polarizers. Optimum viewing is obtained if the orientation of the light is toward the observer. The result is a brighter display with a wider viewing angle. The light is oriented at a specific angle based on the polarizer orientation. To control light orientation, LCD manufacturers purposely modify the display elements (pixels) by a method referred to as "rubbing." Rubbing causes the LCD material to polarize or orient in the direction of rubbing. To widen the viewing angle, some manufactures modify the LCD material in the display element with a special rubbing technique by rubbing one half of the display element to spread some of the light out the right side of the display element and rubbing the left side of the display element to have some of the light spread out of the left side of the display element. In this way, the light is directed both left and right toward the observer. Premium designs divide the display element into four differentially rubbed sections to direct the light vertically out the top and the bottom of the display element as well as left and right. Such LCDs have greatly improved viewing angles, but at the cost of less overall brightness due to light spreading in four directions.

Viewing angle can also be improved by making the display thinner. This reduces parallax effects by shortening the distance from the light source to the "lens" (i.e., the LCD element). LCDs take considerable time to turn completely ON or OFF. Consequently, in a television application where relatively high frame rates are required, LCDs generally do not have sufficient time to turn completely ON or OFF. This is manifested in low contrast. Contrast is a major problem for non-emissive devices such as LCD's which control a light passing from back to front. Therefore, because of addressing time limitations, a compromise is made between light OFF and light ON.

Generally, matrix address displays have activating drivers that provide data on one set of data electrodes and another set of drivers for scanning electrodes. In such displays, the electrical connections to the scanning electrodes remain connected to the driver output even while the scanning electrode is not selected (not driven). Thus, display elements associated with the data electrode may pick up charges from addressed display elements, but not the addressed row. This charge spill-over, sometimes called "crosstalk," happens when the data electrode provides unintended charge to the display elements associated with adjacent selector electrode (s). Poor contrast ratio is the result. Typically, the vertical electrodes contain data and bear different voltage levels applied to them which control the intensity of the LCD display element. Every time the voltage is turned ON for a particular display element, a small amount of charge leaks to adjacent display elements. Some of these proximal display elements get partially turned ON, leading to the appearance of unintended voltage on these adjacent display elements resulting in a poor contrast ratio.

Several attempts have been made to solve the problem of poor contrast ratio in LCD display systems, in particular passive matrix displays, but most prior art solutions have achieved limited success. The flat panel liquid crystal color displays of the prior art have had certain features that have compromised their acceptability.

By way of example, U.S. Pat. No. 3,765,011 to Sawyer et al. purportedly uses capacitors and switches. U.S. Pat. No. 4,516,053 to Amino describes a flat panel display apparatus with two insulating plates separated by striped barriers. In Amino, however, a brilliant display is purportedly achieved by reducing the width of transparent electrodes at the observing side of the display. U.S. Pat. No. 4,832,457 to Saitoh discloses a multi-panel liquid display device. In order to provide a large displayable area, a plurality of liquid crystal display panels are combined together to form a display device to overcome and mitigate the effects of a lattice-like blank problem, which is inevitably formed at the joint between the display panels. In U.S. Pat. No. 5,237,437 to Rupp, a high contrast, wide viewing angle liquid crystal display is purportedly disclosed. However, this display architecture entails a method of fabrication that manipulates the thickness of sub-pixel color display elements and liquid crystal thickness to control optical transmission. Other known methods in the prior art employ polarizers and color filters to improve viewing angle and brightness. For example, the crossed polarizer, twisted nematic type of liquid crystal display has a transmission through the liquid crystal display element that is uninhibited for zero applied voltage. This liquid crystal display configuration is referred to as a normally white display and is used in many display applications such as in watches and calculators. Generally, linear polarizers are oriented in a mutually parallel configuration. This provides a display with no optical transmission (i.e., black) when the liquid crystal media is not activated. In such displays, the optical transmission increases with applied voltage.

In order to compete in the large display television market, the performance of the display cannot be less than the performance of projection television or CRT displays. Poor contrast ratio, high drive voltage, low brightness, limited viewing angle and the cost of current passive LCD panels have all prevented large screen passive LCD television products from entering the non-commercial television market.

SUMMARY OF THE INVENTION

It is, therefore, an object of the invention to improve the contrast ratio of passive LCD displays.

Another object of the invention is to lower the drive voltage requirement for passive LCD displays.

A further object of the invention is to produce flat panel displays efficiently, while decreasing the cost of manufacturing.

Yet another object of the invention is to improve the viewing angle and brightness of passive LCDs.

Still another object of the invention is to produce a display panel architecture with a thin design and light weight that minimizes or eliminates handling and shipping problems exhibited by large bulky projection and large screen CRT products yet provides an efficient and high performance display.

It is another object of the present invention to provide a display architecture which can, if desired, be fabricated with either a compact array of picture elements, thus rendering it suited to use in a projection display system or with a large number of picture elements to provide a high resolution display.

The display structure of the present invention includes parallel opposing major substrates. A predetermined pattern of transparent conducting, electrodes are placed on inner surfaces of the optically transparent substrates. Column electrodes are placed on one substrate while row electrodes are placed on the other substrate. An intermediate double-sided, optically transparent intermediator substrate having transparent conducting material textured on both sides is interposed between the two electrode bearing substrates. LCD material is disposed between the column electrode substrate and the intermediator substrate. Similarly, LCD material is disposed between the row electrode substrate and the intermediator substrate.

In a preferred embodiment of the present invention, a glass substrate is textured with indium tin oxide (ITO) row electrodes and another glass substrate is textured with ITO column electrodes. A double-sided ITO-textured intermediator substrate is disposed between the two electrode substrates as a common plane. The glass column substrate and row substrate are sandwiched together with the intermediator common plane between. A variety of timing devices may be employed to achieve timing synchronization for the display. As those skilled in the art recognize, well known timing structures, devices and techniques of many different types will satisfy the requirements presented by the timing synchronization needed to address the display of the present invention.

Typically, activating signals of opposite polarities are applied preferably in the alternate frame periods across the LCD material to minimize or reduce the rate of deterioration of the LCD material generally caused by repetitive twisting of liquid crystals. The electro-optical characteristics of an image location, e.g. whether it will appear dark, bright or an intermediate shade, is determined by the orientation of the liquid crystal molecules within that image location under the influence of an electric field. For example, in root mean square (RMS) responding displays, changes in alignment of liquid crystal molecules under electric field excitation also change the optical characteristics of the LCD material. The direction of orientation can be altered by the application of an electric field across the image location which field induces a dielectric torque on the molecules that is proportional to the square of the applied electric field. The applied electric field can be either a DC field or an AC field.

The common plane can either serve as a plane of fixed reference potential or it can be switched between different levels of potential, preferably between ground potential and a positive voltage level. In a first addressing method, with the common plane at a fixed reference, the potential difference across the LCD material can be driven between a positive and negative voltage level to generate an RMS (root mean square) voltage. The fixed reference potential can optionally be at ground potential.

In the second addressing method, the common plane is devised to be switchable between a fixed reference potential and another potential. A voltage signal of one polarity is sufficient to generate an RMS voltage across a display element in the second addressing method. Because rather than requiring a positive and negative polarity voltage signal to generate an RMS, the switchable polarity attribute of the common plane allows it to switch between the ground and a positive polarity which provides a similar effect of switching between a positive and negative polarity voltage signal. Consequently, the design of the driving system of the display structure is simplified.

Those skilled in the art will recognize that many widely used methods for addressing passive matrix LCDs based on the techniques described by P. Alt and P. Pleshko in numerous sources that known by those skilled in the art may be employed in the above explained first addressing method. Another traditional method of addressing passive matrix liquid crystal displays as described in U.S. Pat. No. 5,420,604 to Scheffer et al. may be employed in the first addressing method case when the common plane is at a fixed reference potential.

However, in the above described second addressing method, since the common plane is devised to be switchable between a fixed reference potential and another potential, the traditional addressing methods may be accordingly readily modified. As will be appreciated by those skilled in the art, in accordance with the above mentioned second addressing method, a hardware implementation of an addressing system may suitably be devised with a simple modification of the controller to provide the alternate polarity activating signals to the common plane structure, preferably in alternate frame periods. This invention lowers the drive voltage required to meet the RMS turn ON voltage of the display element. The common plane divides the display structure thickness, thereby requiring significantly lower drive voltages to produce a given contrast ratio. In the second addressing method, the maxi mum drive voltage on the row electrodes and the column electrodes can be approximately equal. Moreover, preferably drive voltage dynamic range may be of single polarity. For example, the drive voltage does not have to swing between the same magnitudes of positive or negative polarity, rather preferably it can go between some positive potential and ground. Consequently, drivers can be operable with a single polarity voltage. They may even drive at identical voltage levels, which is not so in existing designs of display structures.

The drive voltage may be further lowered by having a comb-shaped design of the row electrode bearing substrate column electrode bearing substrate and the common plane forming a plurality of levels. Based on the number of these levels in the design, the drive voltage may be further lowered while keeping the same overall thickness of the display structure. However, as those skilled in the art will appreciate from this disclosure, other combinations of the structures and principles shown here are adaptable to the present invention to lower the drive voltage.

The poor contrast ratio performance of passive LCD display structures is significantly improved by the intermediate common plane-based display architecture of the present invention. Typically, crosstalk results due to charge spill-over effects, while a column electrode is driven, contributing to the deterioration of visual contrast of a display. A variety of signal regulation schemes may be employed to achieve reasonable electrode potentials to enhance the contrast ratio. The intermediate common plane provides a more complete ON or OFF transmittance, as well as gray scale-based state for each display pixel, thereby significantly improving the contrast ratio.

In a preferred embodiment of the present invention, image locations are formed by the overlap of the column and row electrodes. An image location is formed at the overlap of corresponding row and column electrodes and is comprised of row and column display elements. The row display element of an image location is formed by the overlap of the corresponding row electrode with the common plane structure, and the column display element of the image location is formed by the overlap of the corresponding column electrode with the common plane structure. Column drivers are selectively connected to a set of the column electrodes to apply a set of activating column signals to the set of column electrodes. Similarly, row drivers selectively connected to the plural row electrodes to selectively apply activating row signals to selected column electrodes. The row driver is selectively connected to a row electrode to apply an activating row signal to the corresponding row electrode.

In an alternate preferred embodiment of the present invention, a wire grid mesh can be employed as a common plane. In another preferred embodiment a film of light absorbing or directing material is disposed adjacent to and coextensive with the two electrode substrates and the common plane. For example, in alternate embodiments of this invention, a film or a layer of phosphor is disposed on front, back or at an intermediate level of the display structure. Alternatively, a color filter may be similarly disposed in place of the phosphor coating. In these alternate embodiments of the present invention, an illuminating light or an ultraviolet light can be provided preferably near the back side of the display. In an another embodiment of the invention, phosphor can be mixed in with the LCD material. As will be readily appreciated by one skilled in the art, a number of variations of this display architecture using a common plane and a combination of features included and devised to improve the performance of liquid crystal displays are possible. For example, the present invention can be employed in various operating modes for a LCD including three basic operating modes: reflective; transflective; and transmissive. Generally, the reflective operating mode utilizes a reflector and does not require a back-light. The most common reflector used is some form of a mirroring device. The transflective operating mode uses a back-light and a reflector, while the transmissive operating mode relies entirely on a back-light for adequate contrast ratio for the displays.

Additional objects, advantages and novel features of the invention will become apparent from the detailed description and drawings of the invention.

BRIEF DESCRIPTION OF THE DRAWINGS

FIG. 5 is an exemplary graph indicating electro-optical characteristics of a display element in a preferred display architecture embodiment of the present invention.

FIG. 6 is an exemplary chart which shows the relationship between a column electrode, a row electrode and common plane signal level with the corresponding state of the image location and display elements of FIG. 2C.

DETAILED DESCRIPTION OF THE PREFERRED EMBODIMENTS

Figure 1:
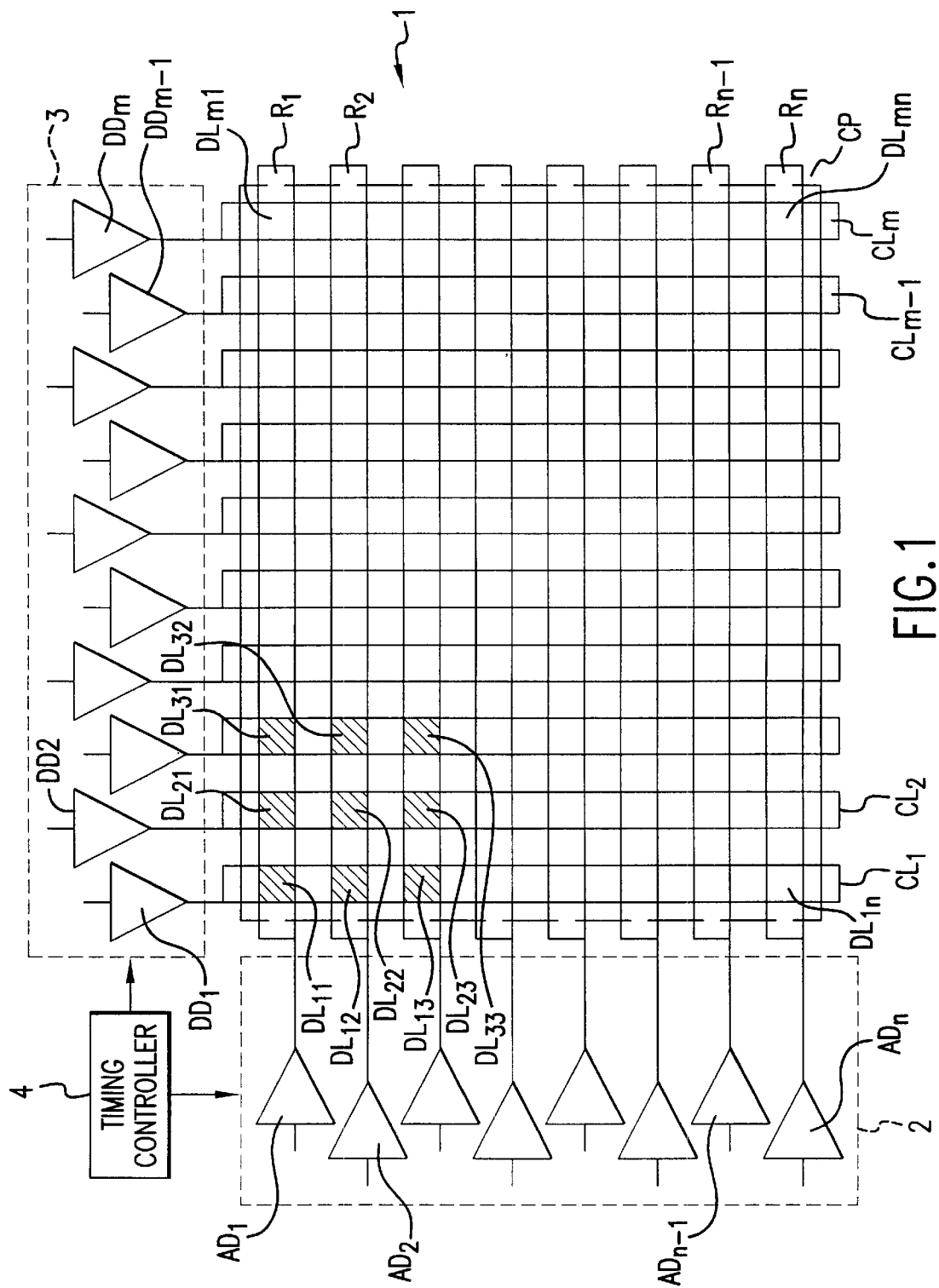
FIG. 1 is a frontal view diagram showing a display surface of a display panel and associated drive circuitry of a display system employing the present invention.

A display system and method for passive displays are provided in accordance with the present invention. The display system may be best described in conjunction with a display system using an RMS-responding liquid crystal display (LCD) depicted in FIG. 1. Referring to FIG. 1, a flat panel display system 1 having a display area includes an address driving system 2, a data driving system 3, and an array of image locations $DL_{11}$–$DL_{mn}$ which, are preferably mutually spaced apart in predetermined directions. The subscripts indicate the location of each individual image location on the display matrix, that is, the "ith" data electrode and "jth" addressing electrode define the image location $DL_{ij}$. In a preferred embodiment, where there are "n" addressing electrodes, there are "m" data electrodes.

A variety of drivers may be employed as data or address electrode drivers. In a preferred embodiment, address driving system 2 includes a plurality of addressing electrode drivers $AD_1$–$AD_n$. Similarly, data driving system 3 includes a plurality of data electrode drivers $DD_1$–$DD_m$. To synthesize an image on substantially the entire area of the display surface, display system 1 employs a timing controller 4 that coordinates the functions of address driving system 2 and data driving system 3 so that all columns of image locations $DL_{ij}$ of display are addressed row by row in row scan fashion. The application of control signal(s) to the address driving system 2 and data driving system 3 determines its operating mode. Each image location $DL_{ij}$ in the array represents the overlapping of the data electrode $CL_i$ and the addressing electrode $R_j$. For illustration purposes, data electrodes $CL_1$–$CL_m$ are arranged in vertical columns hereinafter referred to as column electrodes and addressing electrodes $R_1$–$R_n$ in horizontal rows and hereinafter referred to as row electrodes $R_1$–$R_n$. It should be apparent that other electrode patterns are possible that may advantageously use the features of the addressing method to be described. The display system 1 is shown having a LCD display area preferably comprised of a pair of closely spaced and generally parallel electrically nonconductive and optically transparent substrates with a common plane "CP" disposed between the two substrates. A seal is placed around the substrates to create an enclosed cell and an electro-optic material, such as, nematic liquid crystal material is disposed in the cell gap. The column electrodes are deposited on a major surface of the one of the above described substrates, and similarly row electrodes are applied on a major surface of the other substrate.

With reference to FIG. 1, column electrodes $CL_1$–$CL_m$ receive information in the form of data signals. Each one of the row electrodes $R_1$–$R_n$ of display 1 receive periodic time-dependent addressing signals from one of the corresponding associated row drivers $AD_1$–$AD_n$, each having a common period, known as frame period. To synthesize an image on substantially the entire display surface area, display system 1 employs a timing controller 4 that synchronizes the operations of data drivers $DD_1$–$DD_m$ and row drivers $AD_1$–$AD_n$ so that all the columns of image locations $DL_{11}$–$DL_{mn}$ of display 1 may be addressed row by row in a sequential manner.

Figure 2A:
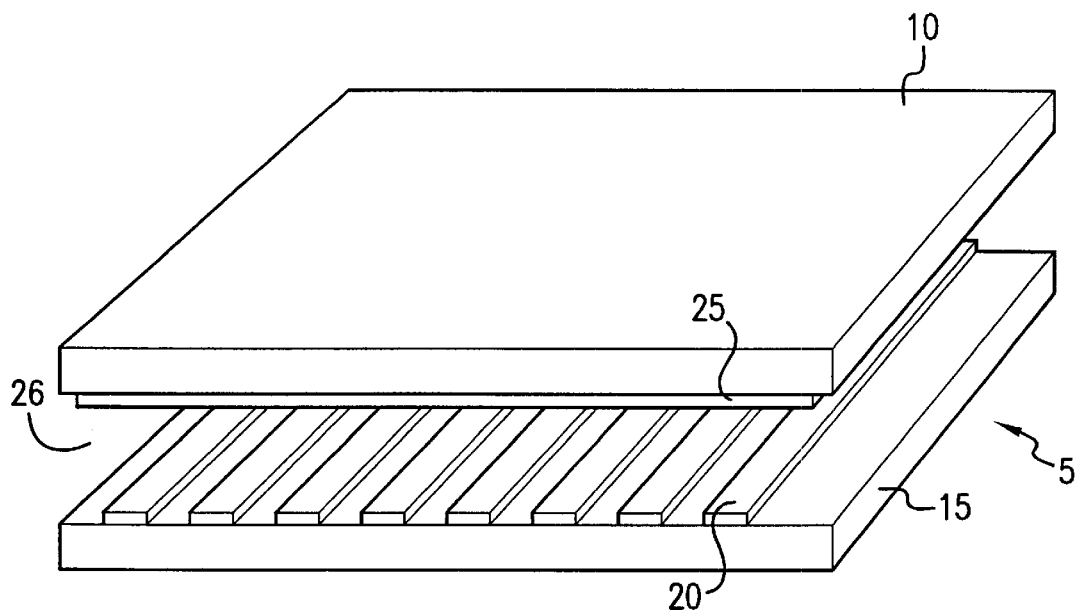
FIG. 2A is a perspective view diagram showing the structure of the display device employing a basic display architecture in known prior art.

A first preferred embodiment of the present invention is now described with reference to FIGS. 2–4. FIG. 2A depicts a basic display structure 5 employing a display architecture from known prior art. The display architecture of FIG. 2A is depicted for comparison purposes and is comprised of two substrates 10 and 15, row electrodes 20, column electrodes 25, and LCD material filled in cell gap 26.

Figure 2B:
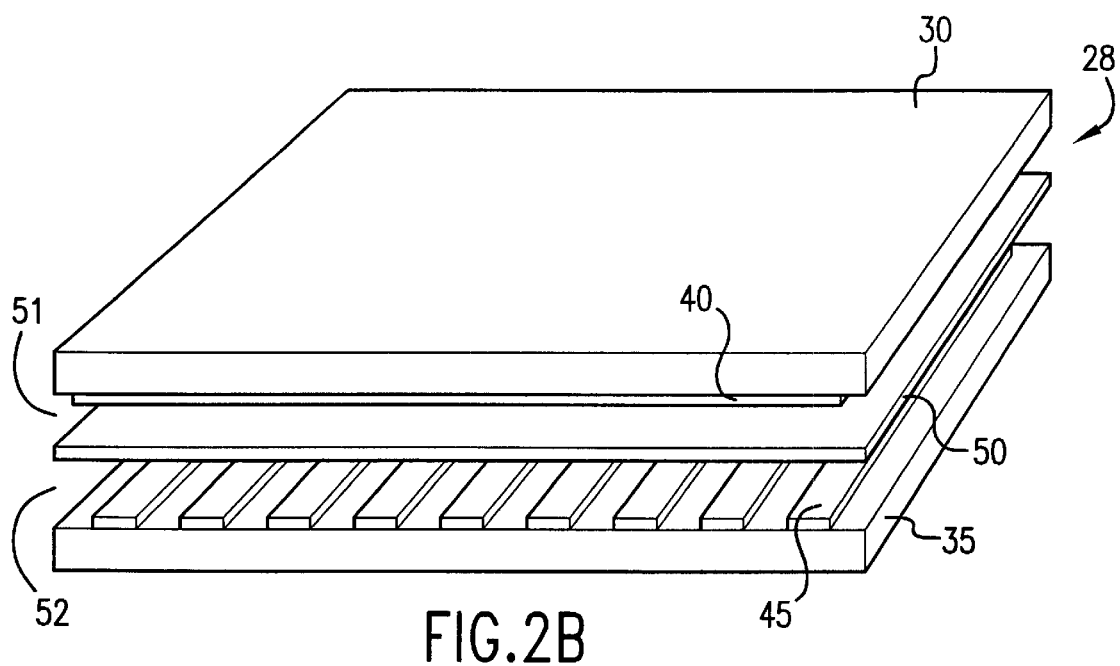
FIG. 2B is a perspective view diagram showing the structure of the display device employing the display architecture of the present invention.

FIGS. 2B, 2C, 2D, and 3 illustrate the structure of the display architecture of a preferred embodiment Of the present invention devised to employ the common plane. Referring to FIG. 2B, basic display structure 28 of preferred embodiments of the present invention is illustrated. The display architecture comprises substrates 30 and 35 textured with column electrodes 40 and row electrodes 45 respectively, a common plane 50, and passive LCD material filled in cell gaps 51 and 52 is shown.

Figure 2C:
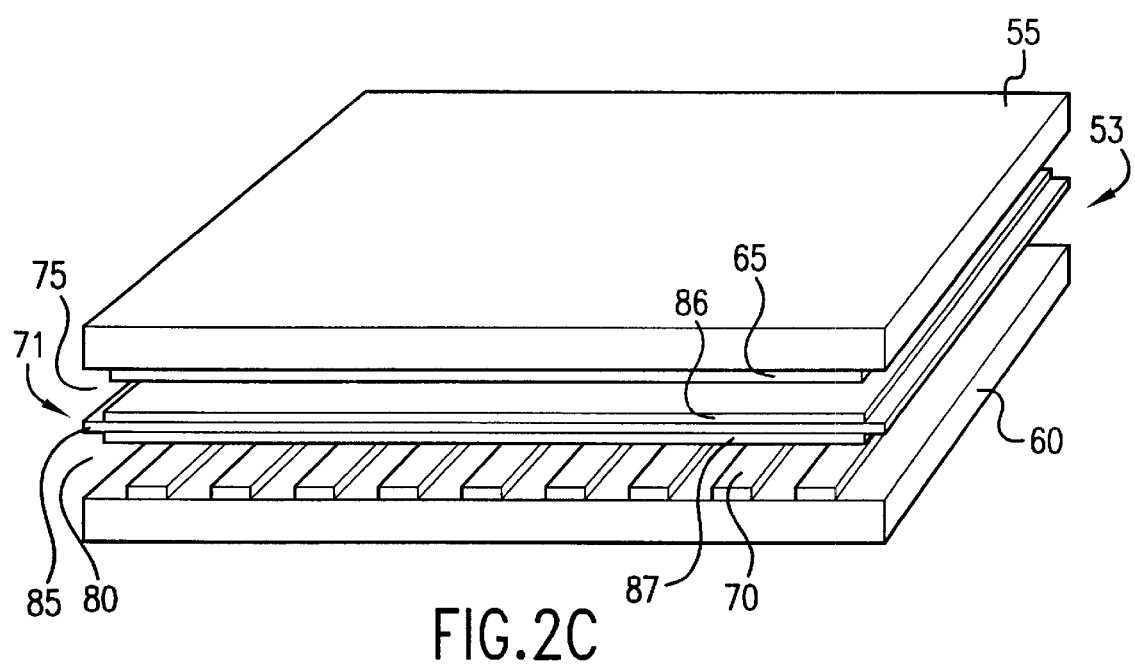
FIG. 2C is a perspective view diagram showing the basic structure of a first preferred embodiment of the display architecture employing the present invention.
Figure 2D:
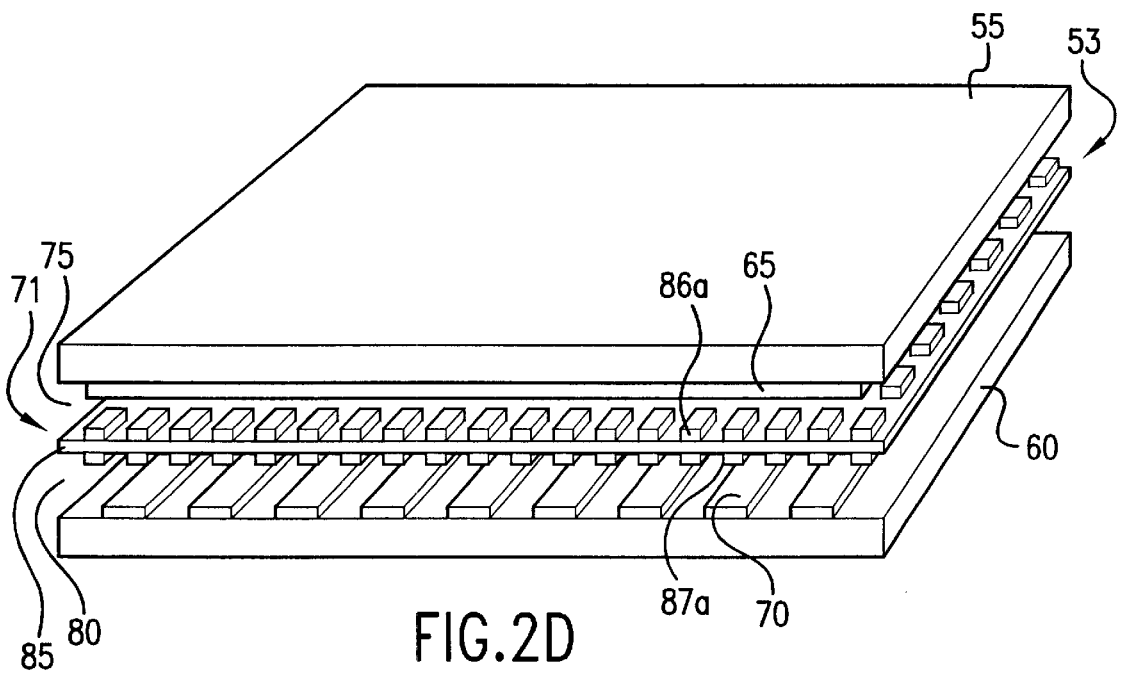
FIG. 2D is a perspective view diagram showing the basic structure of a second preferred embodiment of the display architecture employing the present invention.

With reference to FIG. 2C, display structure 53 depicts an exemplar display architecture of a first preferred embodiment of the present invention. The display architecture includes two substrates 55 and 60 textured with column electrodes 65 and row electrodes 70, respectively, a common plane 71, and STN LCD material filled in cell gaps 75 and 80. With continuing reference to FIG. 2C, the common plane 71 is comprised of glass substrate 85 and ITO layers 86 and 87 coated on the two major surfaces of glass substrate 85. Those skilled in the art will recognize that electrode patterns described here are adaptable to a variety of formats and densities. Although FIG. 2C illustrates a common plane structure of a double-side glass substrate coated with ITO, it is to be understood that, in display architectures devised in accordance with the present invention, the common plane may, but need not, be similarly structured. For example, a common plane in other embodiments may employ wire mesh structures 86a, 87a shown in FIG. 2d, replacing the layers 86, 87 of the embodiment shown in FIG. 2C.

Figure 3:
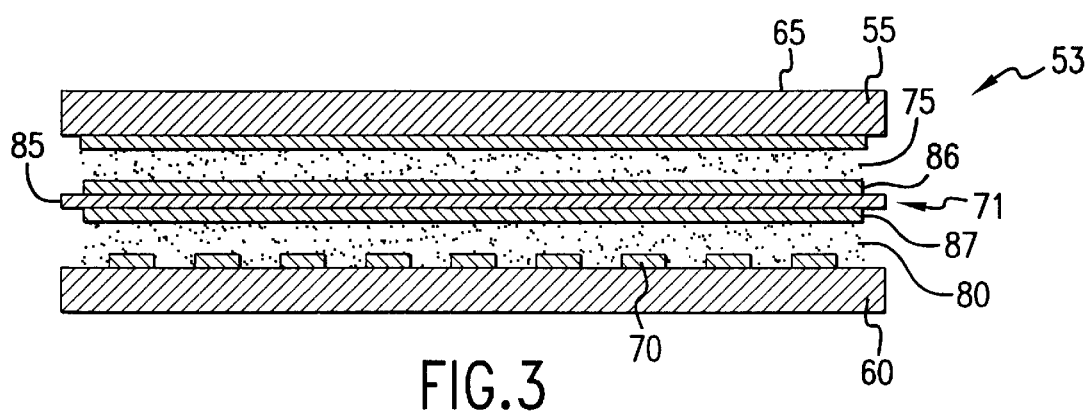
FIG. 3 is a cross-sectional diagrammatic view of FIG. 2C and illustrates the components of a first preferred display architecture implemented in accordance with the common plane technique of the present invention.

FIG. 3 illustrates a cross-sectional view of the display architecture of the first preferred embodiment of this invention. By employing common plane 71, column electrodes 65 and row electrodes 70 may be driven by significantly lower drive voltages than those required by display architectures that do not employ an intermediate common plane. Because STN LCD material is divided in two layers 75 and 80, the drive voltage required to turn ON the LCD material may be established by approximately one-half the drive voltage otherwise required without common plane 71.

For example, in a typical conventional display structure 180 micrometers thick, use of a common plane, located between two electrode substrates splits the LCD material into two 90 micrometer sections. Assuming the LCD material takes 1 volt per micrometer to turn ON, a complete ON state would require a drive voltage of 90 volts. To get a similar contrast ratio in a known prior art passive display architecture not having a common plane would require 180 volts to reach an ON state. The driving voltage is, consequently, reduced by half Further, the drive voltage may be of a single polarity.

It should also be apparent that, with faster responding display media, such as those employing plasma technologies, the present invention may be exploited to include a common plane structure and thereby achieve many of the advantages of the present invention. A typical display media has a variable transmissivity depending upon the bias across it.

Figure 4:
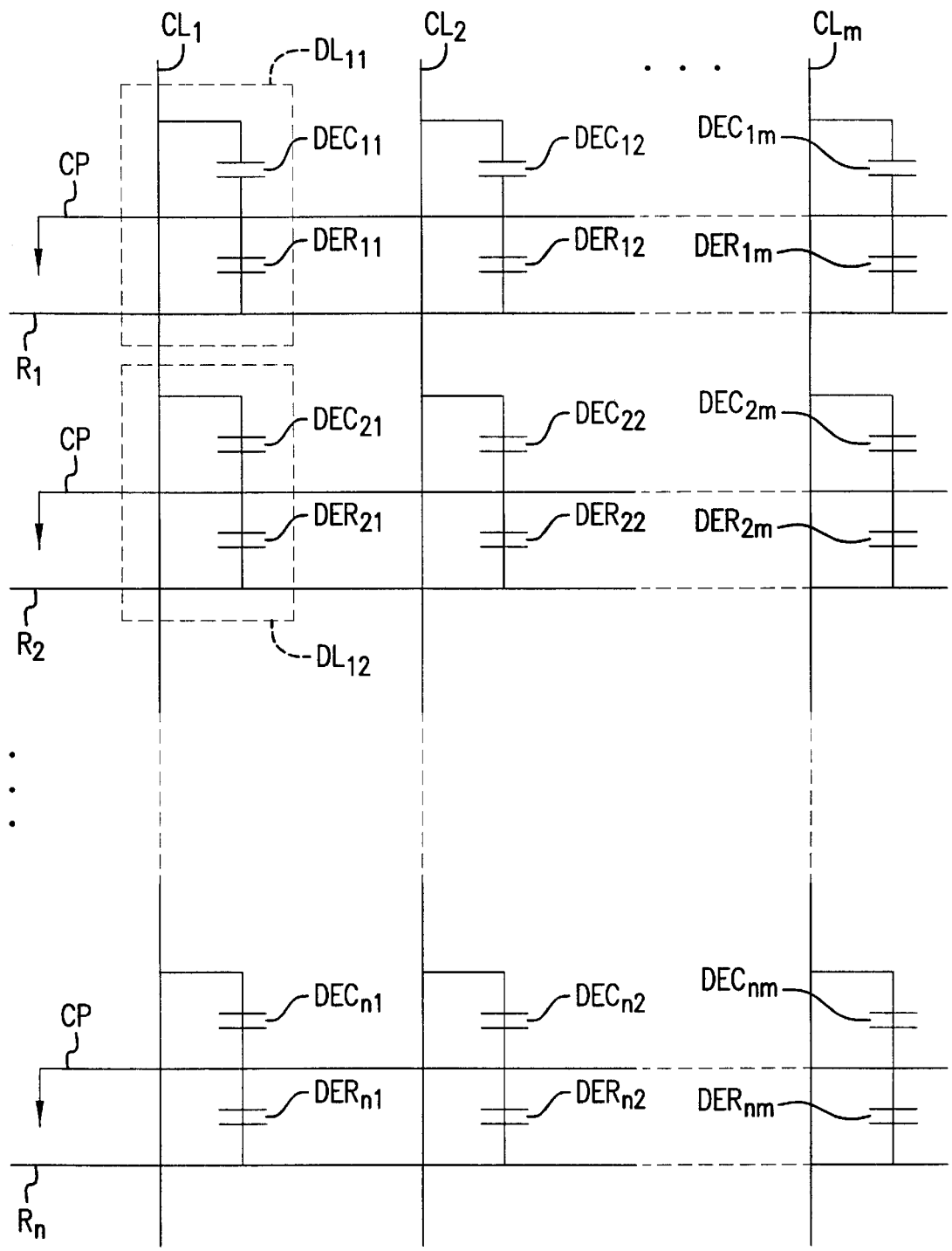
FIG. 4 is an illustration of an equivalent circuit showing the electrical properties associated with typical structural components of the display architecture of FIG. 2C.

Referring to FIGS. 3 and 4, to turn ON the liquid crystal display material layers 75 and 80, data signals are applied to column electrodes $CL_1$–$CL_m$ and corresponding row electrodes $R_1$–$R_n$. When a row electrode is addressed, the STN LCD material layers between the column electrodes and the row electrodes provide an electrically conductive path through the two dielectric layers. With reference to FIG. 4, the dielectric layers are represented by column display elements $DEC_{11}$–$DEC_{nm}$ and row display elements $DER_{11}$–$DER_{nm}$ with one terminal of all the display elements being electrically connected to the common plane CP. Traditionally, only one display element is present at each image location on the display matrix. In the present preferred embodiment, two display elements are present at each image location due to the presence of the common plane.

For example, the two display elements $DEC_{11}$ and $DER_{11}$ are formed at image location $DL_{11}$. The column display element $DEC_{11}$ is formed by the overlap of column electrode $CL_1$ and common plane CP. Similarly, row display element $DER_{11}$ is formed&by the overlap of row electrode $R_1$ and common plane CP. For the present description, with respect to the electrodes and the common plane, "overlap" refers to being oriented in a manner that they are superimposed with the liquid crystal display material disposed between them. However, most typical architectures for STN LCD contemplate only one display element at the corresponding image location formed by the associated row and column electrodes. This embodiment of the present invention has been described as having two display elements at each image location.

The dual level structure employing common plane architecture significantly improves the contrast ratio relative to traditional displays. The second level isolates the charge storage mechanism, therefore the display architecture of the present invention provides significantly more contrast for each image location. For example, when image location $DL_{11}$ is addressed by simultaneously providing display signals at column electrode $CL_1$ and row electrode $R_1$, both the display elements $DEC_{11}$ and $DER_{11}$ are in the ON state. However, in FIG. 4, display element $DEC_{21}$ is also in the ON state, but display element $DER_{21}$ remains isolated from the charge at $DL_{11}$ (composed of $DEC_{11}$ and $DER_{11}$) and, therefore, the LCD material at $DER_{21}$ remains unbiased and there is no consequent appreciable reduction in contrast between $DL_{11}$ and $DL_{12}$ due to charge spill-over.

Based on the display architecture design in the present invention, with either a fixed reference potential at the common plane CP or the alternative switch potential at the common plane technique, a variety of display methods are contemplated by the present invention.

In a display method where common plane CP is fixed at a reference potential, approximately full dynamic range of the driving signal, such as, from maximum negative polarity to maximum negative polarity, may be employed to generate an RMS signal across an image location. Similarly, in the display method in which the common plane is switched from ground to positive potential rather than being fixed data reference potential, the ON state may be achieved. For example, an RMS signal may be generated by applying a positive potential at CP and applying to both corresponding row and column electrodes a fixed, or ground potential. Consequently, drive system design is significantly simplified by employing single polarity drive voltage drivers, which drivers are familiar to those skilled in the art.

As previously described, the two STN LCD layers are obtained by enclosing the liquid crystal composition between the two substrates with electrodes formed on their inner surfaces and the surfaces of common plane CP. FIG. 5 is an example of the electro-optical characteristics of a typical display element of the present embodiment. FIG. 5 is obtained when a voltage is applied between column electrode $CL_1$ and the row electrode $R_1$. A dark condition at low voltage and a bright condition at high voltage may be obtained. In the present embodiment, a voltage $V_{ON}$ for obtaining maximum transmittance and a voltage $V_{OFF}$ for obtaining minimum transmittance can be determined for a desired contrast ratio. For example, voltage $V_{ON}$ preferably may determine the ON state of a display element and voltage $V_{OFF}$ preferably may determine the OFF state of the display element. In accordance with the previously described composition of an image location in the present embodiment, both the display elements $DEC_{11}$ and $DER_{11}$ can be either in ON or OFF states depending on the voltage levels at the column electrode $CL_1$, row electrode $R_1$, and common plane CP. Because transmittance of each image location can be controlled by the electro-optical characteristics of two display elements formed at that location, the resulting display has significantly improved contrast ratio.

FIG. 6 illustrates electro-optical characteristics of the image location $DL_{11}$ and the associated display elements $DEC_{11}$ and $DER_{11}$. The transmittance states are determined by the associated signal levels available at the corresponding row, column electrodes and common plane CP. The tabulated image location and display element profiles depend upon the LCD material employed in a display structure. Moreover, the previously described second display addressing method is assumed with common plane CP switchable between a fixed reference potential and a positive polarity voltage level preferably sufficient to turn ON the LCD material. In the column titled "ROW" the availability of signal at the row $R_1$ is indicated by "1" and absence by "0." Similarly, in the second column titled "CP", "1"indicates positive a polarity signal and "0" a fixed reference potential, preferably ground. The third column titled "COL", the fully ON state is indicated by "1" and completely OFF state by "0". The fourth column titled "D-STATE" indicates transmittance state of image location $DL_{11}$. The last column titled "L-STATES" indicates the display element's transmittance state corresponding to the image location $DL_{11}$. Therefore, depending upon the transmittance state of row display element $DER_{11}$ and column display element $DEC_{11}$, the overall transmittance state of the image location $DL_{11}$ is determined. Consequently, there is significantly more control over the electro-optical characteristics of a typical image location appropriate for particular signal levels and desired contrast ratios. For example, the image location can be at "GRAY" state when either of the two display elements $DER_{11}$ and $DEC_{11}$ are in the OFF state. As those skilled in art will appreciate, the table described here is an example only and not to be construed as design limitation required for employment in the preferred embodiment of the present invention. Further, the designation "GRAY" can encompass a wide range of transmissivity. A multiple common plane structure would result in a more complex combinatorial figure similar to FIG. 6.

Figure 7:
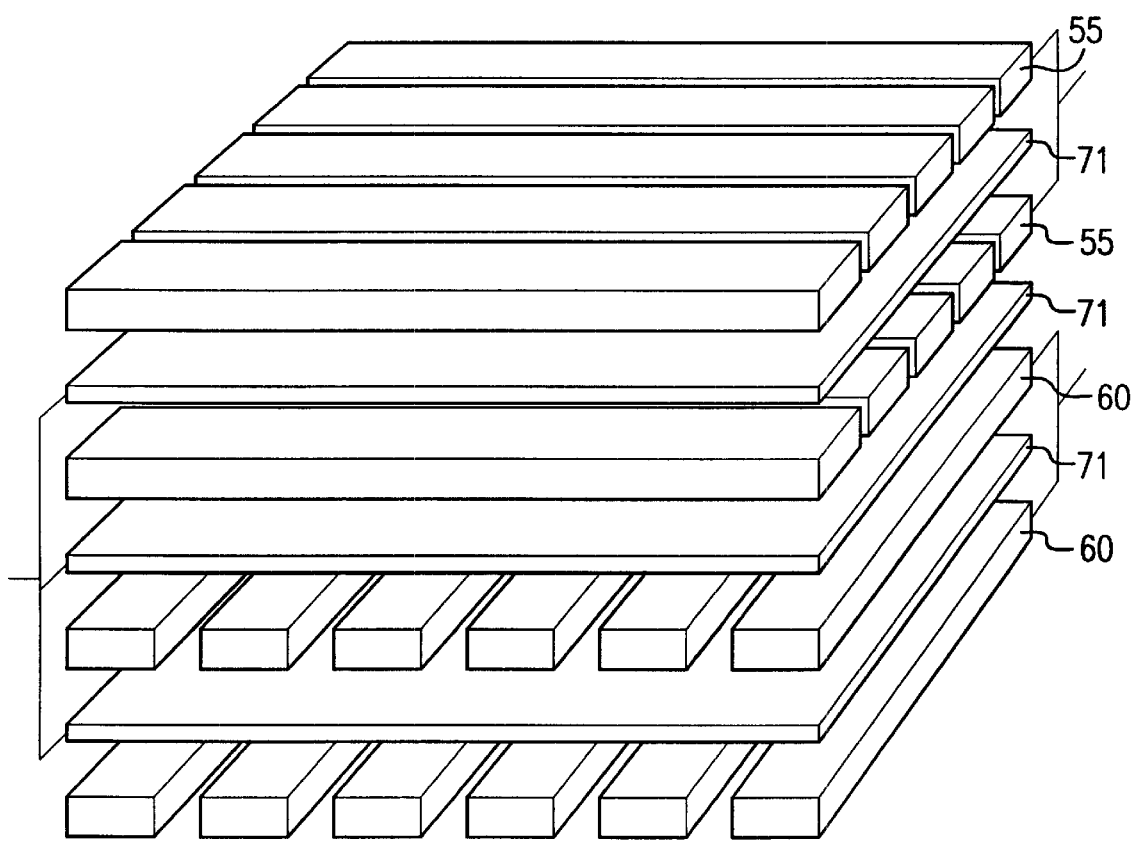
FIG. 7 is a schematic perspective view showing the structure of an alternate embodiment of the display structure employing the display architecture of the present invention with comb-shaped column and row electrodes along with common planes.

Referring to FIG. 7, in an alternate embodiment of the present invention, column electrode textured substrate 55, row electrode textured substrate 60, and common plane 71 are adapted to provide a multiple level design intended to lower the drive voltage requirement of a display system. In particular, a comb-shaped structure is employed to obtain a plurality of levels to substantially reduce the gap between common plane 71 and the other two substrates resulting in a lower drive voltage requirement. For example, by devising a display architecture shown in FIG. 7, since the total display material layer thickness is divided in plurality of levels, the drive voltage is lowered accordingly. As shown, the display architecture is configured as a comb-shaped structure with each electrode textured substrate having two levels and common plane may be fashioned as having three levels. For example, using this technique in this embodiment, a 90 micrometers thick display structure, the LCD material is split into six 15 micrometer sections. Assuming the LCD material takes 1 volt per micrometer to turn ON, 15 volts are required to reach ON. To achieve the same sort of contrast ratio in a known prior art STN display architecture, a thickness of 90 micrometers would require 90 volts to reach the ON state.

In an another alternate embodiment of the present invention, the need for expensive color filters is eliminated. In place of a color filter, to attain a similar functionality, significantly cheaper, red, green, and blue phosphor material is used. Traditionally, once the light passes through the polarizers, it must pass through the color filter. The color filter permits only light that is of the same color to pass. The color filter is responsible for the majority of light lost in a display. This embodiment of the present invention uses a phosphor in place of a color filter. As in a CRT display, the phosphor radiates light. Here, the light passing through the display element is not attenuated by color filters, but is instead converted by the phosphor to red, green or blue light. Since the light from the phosphor is radiated rather than filtered, the light is emitted in all directions. The phosphor-based embodiment of the present invention allows the display architecture to have a viewing angle and brightness comparable to a CRT display. Unlike conventional LCD display architectures, which typically have an 80°×110° field of view, the display structure of the present invention has a significantly improved field of view of approximately 160°×160°, which is comparable to the viewing angle of CRT displays.

Figure 8A:
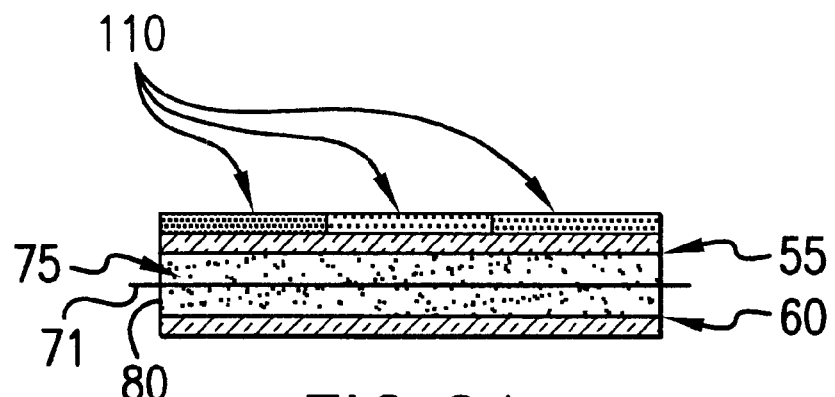
FIG. 8A is an illustration of an alternate embodiment of the display architecture of the present invention with color filter.
Figure 8B:
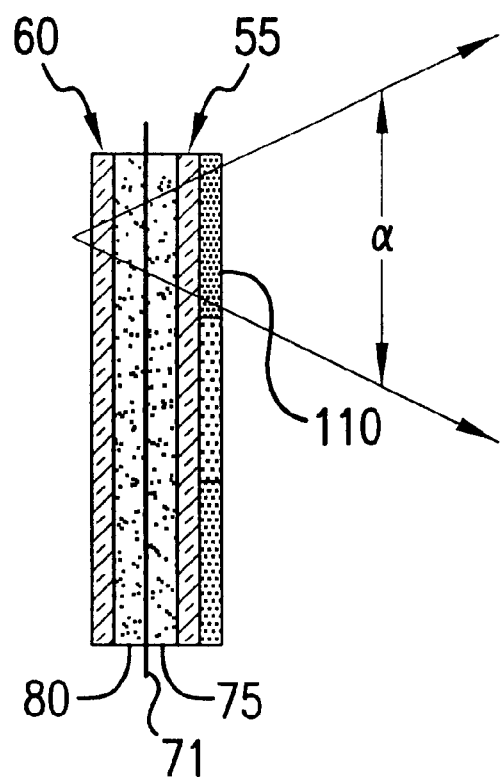
FIG. 8B is an illustration of an alternate embodiment of the display architecture of the present invention with color filter and viewing angle.
Figure 9A:
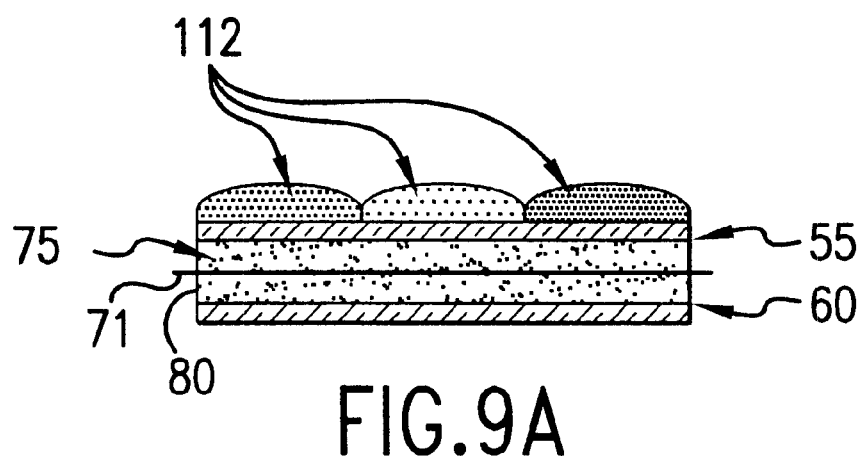
FIG. 9A is an illustration of an alternate embodiment of the display architecture of the present invention with phosphor.
Figure 9B:
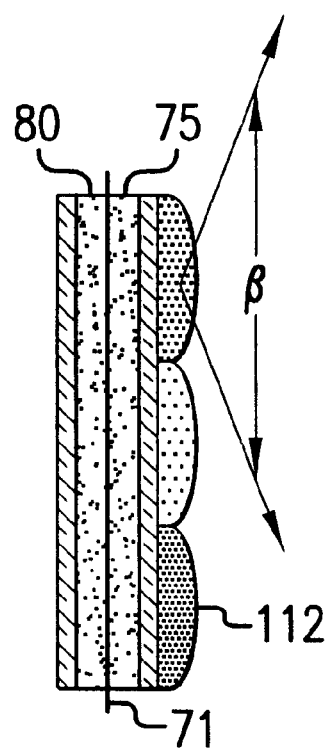
FIG. 9B is an illustration of an alternate embodiment of the display architecture of the present invention with phosphor and wider viewing angle.

A color filter 110, which is conventional in LCDs, is shown in FIG. 8A combined with a common plane 71 in accordance with the above teaching. The color filter 110 is one of the most expensive components of a LCD display. The color filter also attenuates most of the light. Only approximately 20% of the light eventually gets through the display element to the user. In addition, because the light source is from the back of the display element, the viewing angle a is reduced as shown in FIG. 8B. An embodiment showing an additional aspect of the present invention, shown in FIG. 9A, uses phosphor 112 instead of color filters. Since the phosphor 112 gives off light, the same as a CRT display screen, the light output, viewing angle, brightness, and colors are the same as that produced by CRT displays. Note that the viewing angle $\beta$ is now greatly increased to approximately 160 degrees, as shown in FIG. 9B.

In an alternate embodiment of the display architecture of the present invention, a method of constructing a STN LCD is developed that eliminates the need for polarizers and color filters. In this respect, the display architecture design of this embodiment allows the LCD material to align itself in a state in which it is either transmissive or opaque, similar to the LCD in a digital watch or a calculator. This is accomplished by adapting the electrical field across the liquid crystal display element.

Figure 10:
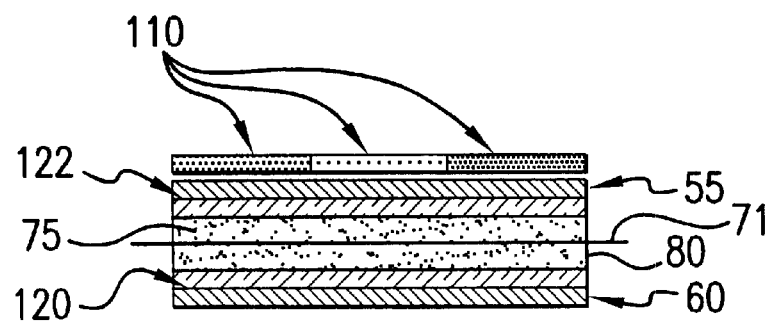
FIG. 10 is an illustration of an alternate embodiment of the display architecture of the present invention with color filter and polarizers.
Figure 11A:
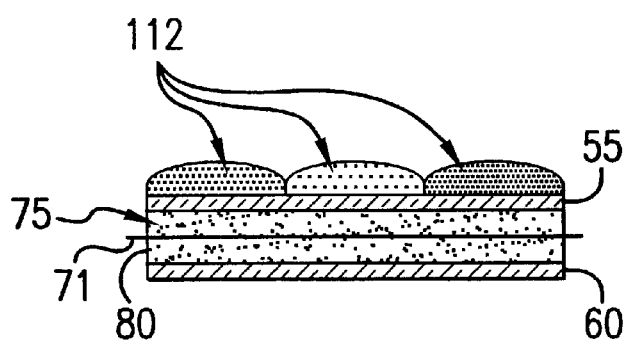
FIG. 11 is an illustration of an alternate embodiment of the display architecture of the present invention with phosphor and meshed or perforated electrodes.
Figure 11B:
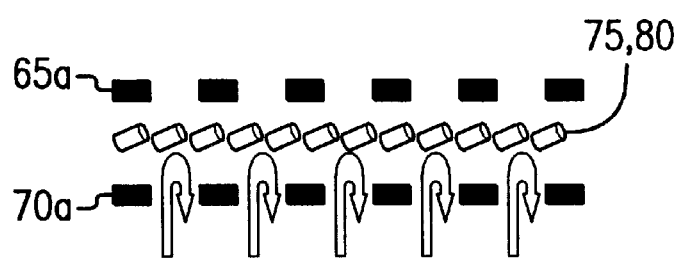
Figure 11C:
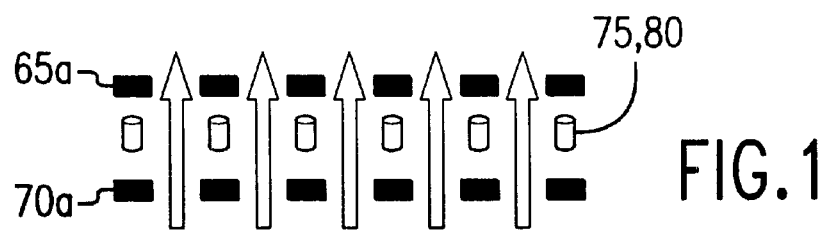

FIG. 10 illustrates an LCD incorporating a common plane 71 in accordance with the above teaching combined with at least two polarizers 120, 122 to control the light. The polarizers are placed at approximately right angles to each other. Light passing through the bottom polarizer 120 is rotated 90 degrees. It is also attenuated at least 50% because only light in the 90-degree plane can pass through the polarizer. The rotated light passes through the liquid crystal material 80, 75 and is completely blocked by the top polarizer 122. The top polarizer 122 will pass only light that is rotated an additional 90 degrees. When a voltage is applied to the electrodes on the substrates 55, 60, the LCD material twists 90 degrees. The light follows the twist through the LCD material so that the light passing through the first polarizer 120 is aligned with the second polarizer 122, to pass through the display. However, both polarizers, the LCD material, the ITO forming the electrodes on the substrates 55, 60, and coating the common plane 71, and the color filter 110, further attenuate the light. In an alternative embodiment of the present invention, the need for polarizers is eliminated by having the LCD material move in and out of the light path passing through the holes in meshed or perforated electrodes 65a, 70a on the substrates 55, 60, respectively. The electric field from the mesh pulls the liquid crystal polymer strands away from the mesh openings as shown in FIG. 11 (the common plane 71 is not shown in FIGS. 11B or 11C for clarity. The figurative illustration of FIG. 11B shows that with no voltage applied to the meshed electrodes 65a, 70a, light is blocked. The figurative illustration of FIG. 11C shows that with a voltage applied to the meshed electrodes 65a, 70a, light passes. This technique significantly reduces the attenuation of light passing through the LCD material. Since there is not a significant amount of light attenuation by either the color filters or polarizers, this display architecture permits the majority of light to pass through the display. The phosphor 112 is approximately 99% efficient. This embodiment provides an improved viewing angle, and increases the light output to approximately 90% as opposed to 20% for LCD designs of the art.

In another embodiment of the present invention, the display architecture uses an infrared or ultra-violet back-light instead of a fluorescent back-light. Typically, most present LCDs use a visible back-light. Most LCDs use a white fluorescent light and color filters. The remaining light is wasted energy. The back-light is also the major source of power consumption in LCD displays. Infrared light is one of the easiest light sources to generate. Moreover, this form of light is abundant in most illuminating light sources. The present embodiment uses infrared light to stimulate the phosphor. Some forms of phosphor radiate more visible light than they receive when stimulated by an infrared light source. By using an infrared back-light, there is considerable power savings.

Figure 12:
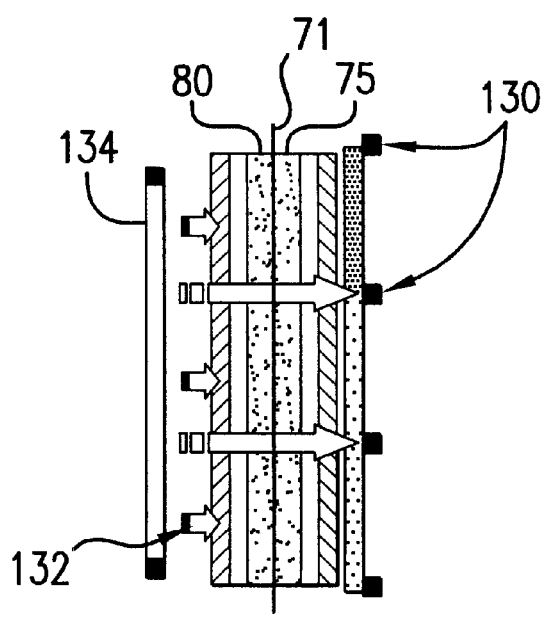
FIG. 12 is an illustration of an alternate embodiment of the display architecture of the present invention employing a color filter with black masks, polarizers and illuminating light.
Figure 13:
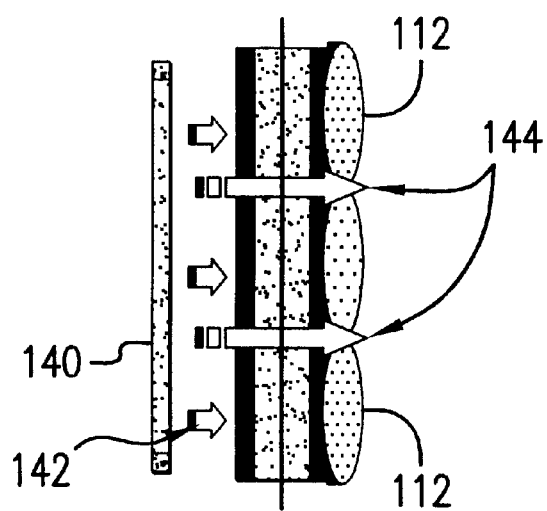
FIG. 13 is an illustration of an alternate embodiment of the display architecture of the present invention with phosphor and infrared light or invisible light.

As shown in FIG. 12, an LCD utilizes a black mask 130 to block unwanted visible light 132 from a visible back-light 134. Any gaps between the display elements are masked with the black mask 130. An alternate embodiment of the present invention is illustrated in FIG. 13, showing an aspect of the invention so that the LCD does not require a mask, since the back-light 140 outputs invisible light 142. The invisible infrared light 142 stimulates the phosphor to glow emitting visible red, green, and blue light. Any light 144 missing the display elements remains invisible, since its frequency is outside the visible range. In addition, most light sources generate more infrared than visible light by several orders of magnitude.

As those skilled in the art will recognize, a variety of display media other than LCD may be devised to utilize the common plane method and apparatus of the present invention. For example, in an alternate embodiment of the present invention, a PDLC (polymer dispersed liquid crystal) display system is employed in which between electrode and common plane substrates, a PDLC film comprising a liquid crystal mixture forming micro-droplets in an optically isotropic, transparent polymer matrix, is placed. One of the refractive indices of the liquid crystal mixture is matched to the refractive index of the polymer matrix, the transmission of which can be varied by applying an electrical voltage.

The embodiments described above are merely illustrative and skilled persons can make variations on them without departing from the scope of the invention, which is defined by the following claims.

I claim:
1. An image display structure comprising:
first and second parallel opposing major substrates;
a plurality of electrically conducting electrodes on the surfaces of the first and second major substrates, wherein the conducting electrodes are arranged so that portions of the conducting electrodes on the surface of the first major substrate overlap portions of the conducting electrodes on the surface of the second major substrate;
an electrically conducting common plane disposed between, and substantially parallel to, the first and second major substrates, wherein the common plane may be selectively connected to an electrical bias source;
first display media disposed between the first major substrate and the common plane, wherein the light transmissivity of the first display media varies in response to an applied electrical field; and
second display media disposed between the common plane and the second major substrate, wherein the light transmissivity of the second display media varies in response to an applied electrical field.

2. The image display structure of claim 1, wherein the common plane comprises an optically transparent substrate having an optically transparent electrically conducting material on at least one major surface thereof.

3. The image display structure of claim 2, wherein the optically transparent substrate has optically transparent conducting material on both major surfaces thereof.

4. The image display structure of claim 1, wherein the common plane comprises a mesh of conducting material.

5. The image display structure of claim 1, wherein the common plane may be selectively connected to an electrical bias source that produces a plurality of electrical potentials.

6. The image display structure of claim 1, wherein the first and second display media are identical.

7. The image display structure of claim 6, wherein the first and second display media are liquid crystal material.

8. The image display structure of claim 1, wherein the first and second major substrates are optically transparent.

9. The image display structure of claim 8, wherein the conducting electrodes on the inner surfaces of the major substrates are optically transparent.

10. The apparatus of claim 1, further comprising:
a first assembly having a major and a minor surface obtained with an alternate arrangement of the first substrate and the common substrate;
a second assembly having a major surface and a minor surface obtained with an alternate arrangement of the second substrate and the common substrate; and
an interleaved configuration of the first substrate, second substrate, and the common substrate is obtained when major surfaces of the first and second assemblies are co-extensive with and adjacent to each other.

11. The apparatus of claim 1, further comprising:
a source of light, configured to direct the light through the first and second substrate and through the display material; and
a phosphor layer on one of the first or second substrates, wherein the phosphor emits visible light in response to incident light thereon.

12. The apparatus of claim 11, wherein the phosphor layer comprises red, green, and blue phosphors.

13. The apparatus of claim 12, wherein the source of light comprises a source of invisible light, and the phosphor layer is configured to emit visible light in response to incident invisible light.

14. An apparatus for displaying patterns, the apparatus comprising:
   a first substrate bearing a plurality of first electrodes;
   a second substrate bearing a plurality of second electrodes, wherein portions of the first electrodes of the first substrate overlap portions of the second electrodes of the second substrate to form a plurality of image locations,
   a common plane disposed between the first and second substrates, wherein the common plane may be selectively connected to a reference bias source;
   a display media having selective transmissivity in response to applied electrical bias, the display media constrained between the first substrate and the common plane, and between the second substrate and the common plane structure, wherein:
      each image location is formed by the overlap of corresponding first and second electrodes; and
      each image location comprises first and second display elements, the first display element of each selected image location being formed by the overlap of the corresponding first electrode with the common plane and the second display element of each selected image location being formed by the overlap of the corresponding second electrode with the common plane;
   a plurality of first drivers connected to the first electrodes to selectively apply first signals to the first electrodes; and
   a plurality of second drivers connected to the second electrodes to selectively apply second signals to the second electrodes.

15. The apparatus of claim 14, additionally comprising a timing controller operably connected to the second drivers to control application of the second signal to a selected second electrode and application of the first signal to a selected first electrode to apply a first electrical bias across the first display elements corresponding to the overlap of the set of first electrodes with the common plane structure and a second electrical bias across the second display elements corresponding to the overlap of the selected second electrode and the common plane structure to selectively modify the transmissivity of the display media of the image locations formed by the overlap of the set of the first electrodes and the selected second electrode.

16. The apparatus of claim 15, wherein the timing controller is configured to selectively apply the first and second signals to selectively change the visual appearance of corresponding first and second display elements to an opaque or a transmissive optical state, thereby establishing gray scales for the display element.

17. The apparatus of claim 15 wherein the timing controller is configured to selectively apply the first and second signals and to maintain a fixed reference potential at the common plane to establish first and second biases across the first and second display elements of each one of said plural image locations.

18. The apparatus of claim 15 wherein the timing controller is configured to selectively apply the first and second signals and to switch the reference potential between a fixed reference potential and a positive or a negative polarity potential.

19. A method of displaying patterns on a display panel, the display panel comprising a first substrate bearing a plurality of first electrodes, a second substrate bearings a plurality of second electrodes, and display media having selective transmissivity in response to applied bias fields, wherein the display media is disposed between the first and second substrates, and wherein portions of the first electrodes of the first major substrate overlap portions of the second electrodes of the second major substrate to form a plurality of image locations wherein each image location is formed by the overlap of corresponding first and second electrodes, the method comprising the steps of:
   applying to a common plane structure disposed between the first and second substrates an electrical reference bias;
   selectively applying to the first electrodes first signals to establish a first applied bias between the selected first electrode and the common plane; and
   selectively applying to the second electrodes second signals to establish a second applied bias between the selected second electrode and the common plane to control the transmissivity of the image location formed by the overlap of the selected first electrode and the selected second electrode.

20. The method of claim 19 wherein the overlap of the first electrode and the common plane structure comprises a first display element, and the overlap of the second electrode and the common plane structure comprises a second display element, the steps of selectively applying the first and second signals change the visual appearance of the corresponding first and second display elements to an opaque or a transmissive optical state to generate a gray scale display at the image location.

21. The method of claim 19 wherein the step of applying to the common plane an electrical reference bias comprises maintaining a fixed reference potential at the common plane structure.

22. The method of claim 19 wherein the step of applying to the common plane Can electrical reference bias comprises switching the common plane structure between a fixed reference potential and a positive or a negative polarity potential.

23. The method of claim 19, further comprising the steps of:
   directing light through one or more of the image locations;
   directing light that passes through an image location through a phosphor layer so that the phosphor layer emits light in response thereto.

24. The method of claim 23, wherein the step of directing light through a phosphor layer comprises directing the light through red, green and blue phosphors.

25. The method of claim 24, wherein:
   the step of directing light through one or more image locations comprises directing invisible light through the one or more image locations; and
   the step of directing light through phosphors comprises directing the invisible light through phosphors so that the phosphors emit visible light.

26. An image display structure comprising:
   first and second parallel opposing major substrates;
   a plurality of electrically conducting electrodes on the surfaces of the first and second major substrates, wherein the conducting electrodes are arranged so that portions of the conducting electrodes on the surface of the first major substrate overlap portions of the conducting electrodes on the surface of the second major substrate;
   display media disposed between the first major substrate and the the second major substrate, wherein the light transmissivity of the display media varies in response to an applied electrical field;

a source of light, configured to direct the light through the first and second substrate and through the display material; and a phosphor layer on one of the first or second substrates, wherein the phosphor emits visible light in response to incident light thereon.

27. The apparatus of claim 26, wherein the phosphor layer comprises red, green, and blue phosphors.

28. The apparatus of claim 27, wherein the source of light comprises a source of invisible light, and the phosphor layer is configured to emit visible light in response to incident invisible light.

* * * * *